United States Patent [19]

Williamson

[11] Patent Number: 4,874,519
[45] Date of Patent: Oct. 17, 1989

[54] PROCESS FOR TREATING WASTEWATER

[75] Inventor: Ronald E. Williamson, Hillsborough, N.C.

[73] Assignee: Orange Water & Sewer Authority, Carrboro, N.C.

[21] Appl. No.: 238,059

[22] Filed: Aug. 30, 1988

Related U.S. Application Data

[63] Continuation-in-part of Ser. No. 201,185, Jun. 2, 1988, abandoned.

[51] Int. Cl.$^4$ .............................................. C02F 3/30
[52] U.S. Cl. ................................... 210/605; 210/615; 210/626; 210/630
[58] Field of Search ............... 210/605, 613, 615, 617, 210/619, 625, 626, 630, 903, 906

[56] References Cited

U.S. PATENT DOCUMENTS

| Re. 32,429 | 6/1987 | Spector | 210/605 |
|---|---|---|---|
| 2,391,494 | 12/1945 | Walker | 210/617 |
| 3,994,802 | 11/1976 | Casey et al. | 210/630 X |
| 4,022,665 | 5/1977 | Ghosh et al. | 435/822 X |
| 4,443,337 | 4/1984 | Otani et al. | 210/615 X |
| 4,522,722 | 6/1985 | Nicholas | 210/605 |
| 4,566,971 | 1/1986 | Reimann et al. | 210/616 |
| 4,692,250 | 9/1987 | Miller | 210/622 X |
| 4,721,569 | 1/1988 | Northrop | 210/630 X |

FOREIGN PATENT DOCUMENTS 1187998  8/1986  Japan .................................. 210/605

OTHER PUBLICATIONS

Lamb et al., *Pilot Studies of Biological Phosphorus Removal*, Nov. 1986.

Primary Examiner—Christine M. Nucker
Assistant Examiner—Rebekah A. Griffith
Attorney, Agent, or Firm—Rhodes, Coats & Bennet

[57] ABSTRACT

The present invention entails a process for treating wastewater utilizing a return activated sludge process. Primary sludge is separated from the wastewater stream and conveyed into a fermentation tank and held a sufficient time to permit hydrolysis of suspended solids so as to produce soluble substrates. The soluble substrates are mixed with the return activated sludge and held for a selected time period to form conditioned return activated sludge. Thereafter, the conditioned return activated sludge is mixed in an initial aerobic treatment zone with pretreated wastewater. Thereafter, the mixed conditioned return activated sludge and pretreated wastewater is conveyed through a series of treatment zones, which may include at least one anoxic treatment zone, where phosphorus and other pollutants are removed from the wastewater.

22 Claims, 3 Drawing Sheets

PROCESS FOR TREATING WASTEWATER

RELATED APPLICATION

This is a continuation-in-part application of U.S. Pat. application Ser. No. 201,185, filed June 2, 1988, now abandoned.

FIELD OF THE INVENTION

The present invention relates to processes for treating wastewater, and more particularly to a biological process for removing phosphorus and other pollutants from wastewater.

BACKGROUND OF THE INVENTION

Wastewater treating processes usually include multiple treatment areas or zones which can be roughly broken down into: (1) a preliminary treatment area; (2) a primary treatment area; and (3) a secondary treatment area.

The wastewater treatment process begins with the preliminary treatment area. Preliminary treatment is concerned with removing grit and damaging debris, such as cans, bath towels, etc., from the untreated wastewater. This is usually a two-stage treatment process whereby the debris such as rags and cans are removed by screens and the grit and heavier inorganic solids settle out of the untreated wastewater as it passes through a velocity controlled zone. The damaging inorganic debris is thus removed by screening or settling while organic matter carried within the fluid stream passes on.

Following the preliminary treatment area, the wastewater is directed to a primary treatment area. The primary treatment area entails a physical process wherein a portion of the organics are removed by flotation or sedimentation. The organics removed include feces, food particles, grease, paper, etc. and are technically defined as suspended solids. Usually 40-70% of the suspended solids are removed in this primary stage.

The third treatment stage is called secondary treatment and is usually a biological treatment process where bacteria are utilized under controlled conditions to remove nutrients or nonsettling suspended and soluble organics from the wastewater. These materials would result in an unacceptable biological oxygen demand (BOD) if left untreated. Typically, one mode of this process consists of a basin in which the wastewater is mixed with a suspension of microorganisms. This mixture is then aerated to provide oxygen for the support of the microorganisms which may then adsorb, assimilate, and metabolize the excess biological oxygen demand in the wastewater. After sufficient retention time, the mixture is then introduced into a clarifier or settler into which the biomass separates as settled sludge from the liquid. The purified fluid then overflows into a receiving stream.

There are three principal types of secondary treatment for effecting treatment of wastewater. The first type, known as a trickling filter, allows the wastewater to trickle down through a bed of stone whereby the organic material present in the wastewater is oxidized by the action of microorganisms attached to the stone. A similar concept is the RBC or rotating biological contactor wherein the biology is attached to the media which rotates in the wastewater and purifies it in the manner of a trickling filter. The second method is an activated sludge process in which the wastewater is fully aerated and agitated by either compressed air or mechanical means together with a portion of the biomass which has been returned from the clarifier or settler. The third process may be referred to as a semi-aerobic (anaerobic/oxic) process in which the first stage is anaerobic or anoxic and is followed by an oxic stage. This anaerobic-oxic-anoxic process is very similar to the initial stages of the Phoredox process and the modified Bardenpho process, both well known in the wastewater treatment industry.

This anaerobic-oxic process was first disclosed in U.S. Pat. Nos. 2,788,127 and 2,875,151 to Davidson which issued in 1957 and 1959, respectively. In the anaerobic-oxic process, the untreated wastewater is first subjected to anaerobic treatment and then to aerobic decomposition. A portion of the sludge formed during the aerobic decomposition is recycled back and mixed with the untreated wastewater being subjected to anaerobic treatment. Davidson noted that the aerobic organisms in the recycled activated sludge are not impaired by passage through the anaerobic reactor an may, in fact, undergo unusual stimulation. Heidi and Pasveer confirmed the work of Davidson in 1974 and found that soluble $BOD_5$ removal occurred in the anaerobic zone.

In recent years, there has been a great deal of work directed at biological processes for removing pollutants such as phosphorus and nitrogen (TKN) from wastewater. This work has in large part been broadly based and has not focused on specific problems and concerns. For example, many wastewater facilities are now facing very stringent phosphorus control standards. When there is already a wastewater treatment facility in place, it becomes prudent to consider the possibility of modifying these existing facilities in order to meet new standards being imposed. Obviously costs, both initial and operating, are of main concern. One important concern then is to evaluate the economics of modifying existing treatment facilities to accomplish biological phosphorus removal.

Beyond the problem of modifying an existing wastewater facility to accomplish effective and efficient biological phosphorus removal, there are certain unique or special problems that can be introduced into the process simply because of the geographical location of the wastewater treating facility and, the particular biological process currently being practiced. These special problems have not been addressed. In this regard, there are certain situations where the wastewater that is being subjected to secondary treatment has a relatively low BOD to phosphorus ratio, that is, a ratio within the range of 7-14. This presents a special problem in biologically removing phosphorus from such wastewater. It is generally appreciated that the higher the BOD to phosphorus and BOD/TKN ratio the easier it is to biologically remove phosphorus from wastewater. Thus, in some geographical locations, where the BOD content of the wastewater is relatively low, it is more difficult to create a favorable environment for the phosphorus consuming microorganisms and consequently, it is more difficult to biologically remove phosphorus. The difficulty is so pronounced that some commercially available processes that claim to biologically remove phosphorus from wastewater will not even warrant their process in wastewater conditions where there is such a relatively low BOD to phosphorus and TKN ratio. The Bardenpho process requires a $BOD_5/TKN$ ratio of 6:25 or higher and the UCT process requires more than 3.6:1.0 ratio, preferably 5 or higher to assure phosphorus removal.

Therefore, there is a need for a biological phosphorus removal process that is particularly designed and suitable for incorporation into an existing conventional wastewater facility. Further, there is a need for an efficient and effective biological phosphorus removal process that is capable of working with wastewater that has a relatively low BOD to phosphorus and TKN ratio due to pretreatment by a fixed film reactor, chemical pretreatment, or influenced by low $BOD_5/TKN$ and low $BOD_5/TP$ industrial wastes.

SUMMARY AND OBJECTS OF THE INVENTION

The present invention entails a wastewater treatment process that is particularly designed to remove phosphorus, nitrogen and other pollutants from raw wastewater having a relatively low BOD to phosphorus ratio. In particular, the present process entails directing raw wastewater through a trickling filter and producing an effluent that is directed through a main stream of secondary treatment that includes both oxic, and if required, anoxic treatment zones. After biological processing, sludge is recovered from the purified wastewater and returned for contact with a side stream prior to contact with the main stream and is referred to as return activated sludge. This return activated sludge is continually recycled and fed back to the main stream.

Suspended organics are separated from the wastewater during primary treatment and are conveyed to a fermentation tank that produces soluble substrates including acetic acid. The produced soluble substrates are mixed and combined with the return activated sludge in a side stream processing step to form conditioned return activated sludge. This conditioned return activated sludge is then directed back to the main stream where it is mixed with trickling filter or RBC effluent in an initial contact zone that is aerobic. Thereafter the mixture of pretreated wastewater and conditioned return activated sludge is directed through a series of stages, including both oxic and anoxic zones, where nitrogen, phosphorus and other pollutants are removed.

The present invention also entails a second design and system that specifically aims at creating a favorable environment for the selection, growth and proliferation of phosphorous consuming microorganisms. In this second design, the return activated sludge is approximately equally divided into two streams, one of which is directed into a feeding cell which forms a part of a sludge nutrification chamber. This feeding cell is directly coupled to the fermentation tank and soluble substrates from the fermentation tank are directed into the feeding cell. By splitting the flow of the return activated sludge and directly feeding only a portion of the microorganisms this effectively increases the food to mass ratio as to the microorganisms being fed. This increased food to mass ratio forms a more favorable environment for the selection, growth and proliferation of phosphorous consuming microorganisms.

It is therefore an object of the present invention to provide a wastewater treatment process for biologically removing phosphorus, nitrogen, and other pollutants and that is particularly adapted to be effective in treating wastewater having a relatively low BOD to phosphorus and BOD to TKN ratio.

An additional objective of the present invention resides in the provision of a wastewater treatment process for biologically removing phosphorus that entails pretreating raw wastewater so as to reduce the BOD to phosphorus and BOD to TKN ratio of the pretreated wastewater prior to its mixture with return activated sludge.

Another object of the present invention resides in the provision of a wastewater treatment process that utilizes fermented raw sludge or other readily available waste organic material as a source of nutrients for microorganisms contained within the return activated sludge.

A more specific object of the present invention is to provide a wastewater treatment process of the character referred to above wherein the fermented raw sludge forms soluble substrates that are mixed and combined with return activated sludge in a side stream to form conditioned return activated sludge which is then directed back to a main stream where the conditioned return activated sludge is mixed and combined with pretreated wastewater effluent.

Another object of the present invention resides in the provision of a wastewater treatment process of the character referred to above wherein the conditioned return activated sludge is mixed with the pretreated wastewater effluent in a first initial contact zone that is aerobic.

It is also an object of the present invention to provide a wastewater treatment process of the character referred to above wherein the wastewater is pretreated (or of unusual $BOD_5/TKN$ ratio) prior to its mixture with the conditioned return activated sludge such that its BOD to phosphorus ratio is ten or less and BOD to TKN radio is less than four or less than 60% of the ratio in the influent wastewater.

Another object of the present invention resides in the provision of a wastewater process wherein nitrification is a principal priority and is accomplished by pretreating raw wastewater by passing the same through a fixed film reactor and then directing the fixed film reactor effluent to a first aerobic treatment zone where the nitrification process begins.

Another object of the present invention is to provide a wastewater treatment process that focuses on forming a favorable environment for the selection, growth and proliferation of phosphorous consuming microorganisms.

A further object of the present invention resides in the provision of a wastewater treatment process of the character referred to above that increases the food to mass ratio of microorganisms in a selected portion of the return activated sludge and wherein the increased food to mass ratio gives rise to a favorable environment for the selection, growth and proliferation of phosphorous consuming microorganisms.

Another object of the present invention is to provide a wastewater treatment process wherein the increased food to mass ratio is achieved by splitting the flow of return activated sludge into at least two streams and directing at least one of the split streams to a sludge nutrification feeding cell where that portion of the return activated sludge is fed directly by a fermentation tank or some other source, thereby effectively reducing the number of microorganisms competing for the available food or soluble substrates.

Other objects and advantages of the present invention will become apparent and obvious from a study of the following description and the accompanying drawings which are merely illustrative of such invention.

DETAILED DESCRIPTION OF THE INVENTION

The present invention entails a wastewater treatment process that has the objective of removing BOD, nitrogen, phosphorus, and other pollutants from a wastewater stream. As will be understood from subsequent portions of this disclosure, the process of this invention entails secondary treatment that relies on basic biological processes to remove BOD, nitrogen, phosphorus, and other pollutants from the wastewater.

Figure 1:
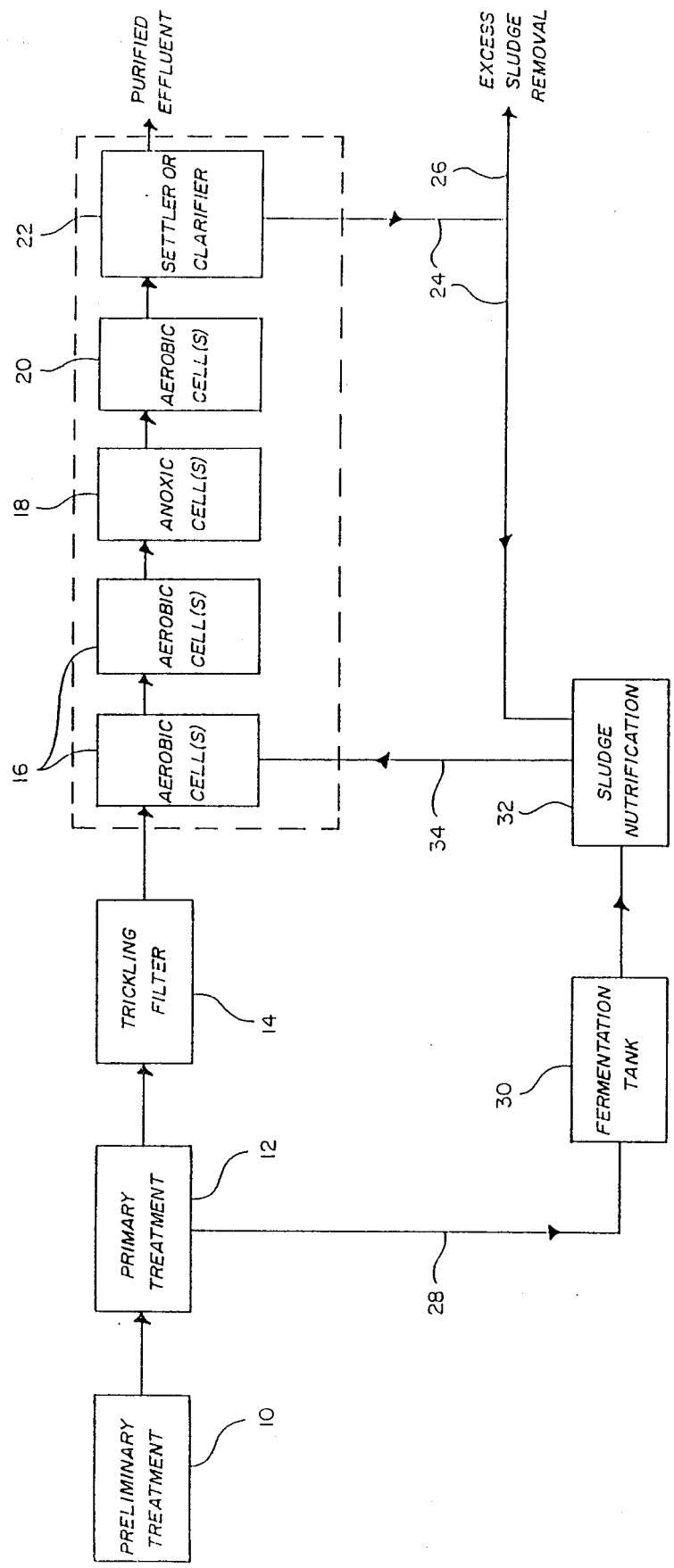
FIG. 1 is a schematic view illustrating the basic wastewater treatment process of the present invention.

With further reference to FIG. 1, in a conventional fashion, raw wastewater enters a preliminary treatment area 10. During the course of preliminary treatment, grit and damaging debris such as cans, bath towels, etc., are removed from the wastewater.

Effluent from the preliminary treatment area 10 is directed to a primary treatment zone or area 12. Again, in conventional fashion, the primary treatment process is a physical settling or retention process where organics are removed from the wastewater through flotation or sedimentation.

From the primary treatment area 12, wastewater effluent is directed to a fixed film reactor such as a trickling filter system 14. The trickling filter system 14 provides an initial biological treatment process for treating the raw wastewater.

From the trickling filter system 14, the raw wastewater effluent is directed through a series of secondary treatment zones or areas, some being aerobic and some being anoxic if nitrogen removal is required.

In particular, from the trickling filter 14, the pretreated raw wastewater is first directed to and through a series of aerobic cells or zones 16. Here the pretreated wastewater is aerated and agitated. For example, one aerobic cell having a 280,000 gallon capacity would receive a portion of the air supplied by a 150 horse power blower that would direct air upward through the contained wastewater. During this phase of the wastewater treatment, the process starts to nitrify ammonia. This, as will be understood from subsequent portions of this disclosure, is a biological process. The amount of ammonia nitrogen, $NH_4N$, in the wastewater can vary depending upon geographical location, season of the year, etc., but it is not uncommon for the wastewater to contain 15 to 20 PPM ammonia nitrogen.

Essentially, during these initial aerobic treatment stages, the supply of compressed air to the wastewater provides substantial oxygen to selected microorganisms which in turn results in the ammonia being oxidized, causing the ammonia nitrogen to be converted to a nitrite or nitrate form, both referred to as $NO_X$.

Thus, the pretreated raw wastewater is directed through one or more aerobic treatment zones 16 where the various pollutants contained in the wastewater are subjected to biological processes that are directed at removing various pollutants from the wastewater. The time or duration that the wastewater is subjected to such aerobic treatment can vary depending on conditions of the wastewater, season, etc. The present process, however, contemplates that the pretreated raw wastewater will be subjected to aerobic treatment for approximately 2–8 hours. In the case of one preferred process and design, it is to be appreciated that there may be more than one aerobic container or cell and that the pretreated wastewater may be directed or routed from one aerobic cell or container to another. In FIG. 1, for purposes of illustration, there is shown two aerobic cells 16, but it is understood that the number of such cells could vary depending on various factors.

After the nitrification process, the wastewater can be transferred to an anoxic cell 18. Anoxic cell 18 functions as a denitrification chamber inasmuch as it converts the nitrate-nitrogen present in the influent to elemental nitrogen. While there may be oxygen present in a form combined with nitrogen, there is no significant amount of dissolved oxygen present in the anoxic treatment cell 18. The wastewater being treated is held within the anoxic cell 18 for a selected time period which in the case of the present process is approximately 1–3 hours. It is understood that in the anoxic cell 18 there would be no supply of external oxygen but the wastewater therein would be continuously mixed by recirculation. As pointed out above, this anoxic treatment zone 18 serves to denitrify, that is to reduce the $NO_X$ levels of the wastewater. This can be accomplished since the microorganisms are continuing to seek oxygen and because of the absence of such in a dissolved form, they start to reduce the $NO_X$ compounds to nitrogen gas. This leaves nitrogen in a stable gaseous form ($N_2$) and consequently permits the same to escape the liquid surface to the atmosphere.

From the anoxic cell 18, the wastewater is then conveyed to an aerobic cell or treatment zone 20 which functions as a stabilization chamber inasmuch as oxygen is added to the influent. In aerobic cell 20, air is supplied and directed upward through the contained wastewater. The amount of air supplied may vary but approximately 10–15 cubic feet per minute per 1000 cubic feet of volume may be adequate for MLSS up to 2000 mg/l. The wastewater is held in aerobic cell 20 for approximately 45 minutes. This operation of the process should increase the amount of dissolved oxygen in the wastewater in the aerobic zone to a level of about 2–4 ppm.

The effluent from aerobic cell 20 is then directed to a settler or clarifier 22. The purified effluent exits from the settler or clarifier 22 and is discharged into a stream or other designated receiving area.

During the wastewater treatment process, sludge settles in clarifier 22 and is drawn off by means of a pump (not shown). This sludge taken from clarifier 22 is directed to a side stream and more particularly to a return sludge line 24. To rid the system of excess sludge, there is provided an excess sludge discharge line 26 for selectively discharging certain quantities of sludge over a given period of time. This excess sludge is directed to sludge digesters or other suitable sludge disposal means. Therefore, it is appreciated that the present wastewater treatment process produces sludge and selected quantities of the sludge is recycled through a side stream return sludge line 24. The sludge passing in the side stream and through the return sludge line 24 is referred to as return activated sludge.

The present process contemplates conditioning this return activated sludge prior to it being brought back into the main stream and mixed with the trickling filter effluent. To condition the return activated sludge, the present process utilizes primary sludge separated from the wastewater at the primary treatment area 12. This primary sludge is conveyed from the primary treatment area 12 through a primary sludge line 28 to a fermentation tank 30 located in a side stream with respect to the main wastewater treatment stream. Over a period of two to five days, organic matter in fermentation tank 30 will produce a high concentration of soluble substrates, including acetic acid. These soluble substrates are then directed into a sludge nutrification chamber 32 that is likewise located in the side stream. Mixed with the soluble substrates within the sludge nutrification chamber 32 is the returned activated sludge. The soluble substrates and return activated sludge are mixed and held within sludge nutrification chamber 32 approximately three hours. This process produces effluent containing a controlled level of microorganisms which have been conditioned to effect the removal of phosphorus from wastewater. It should be noted that the conditions existing in and around the sludge nutrification chamber are essentially anaerobic although the return sludge input could be anoxic. The effluent produced by the sludge nutrification chamber 32 is referred to as conditioned return activated sludge.

The conditioned return activated sludge is directed through line 34 to the first or initial aerobic treatment zone 16 where the conditioned return activated sludge is mixed with the trickling filter effluent under aerobic conditions. It is to be emphasized that this is the first contact of the conditioned return activated sludge with the wastewater effluent, all of which occurs in an initial aerobic contact and treatment zone 16. The conditioned activated sludge may be supplemented with acetic acid chemical in the sludge nutrification chamber 32.

Therefore, it is appreciated that raw wastewater is first directed through preliminary and primary treatment areas 10 and 12 respectively. Primary effluent is directed to and through a fixed film reactor, such as a trickling filter system, after which the trickling filter effluent is directed through a secondary main stream treatment process. At the end of the main stream, sludge is removed from the wastewater and returned through a side stream. During the return, the return activated sludge is conditioned and then mixed with the wastewater effluent in the main stream.

The present biological process has been developed to remove a number of pollutants from the wastewater. Among the pollutants that is the target of the present biological process is phosphorus. In order to remove phosphorus from the wastewater, specific microorganisms are utilized to remove phosphorus from the wastewater. In a broad sense, select microorganisms are developed and growth enhanced in the nutrification chamber 32 to later remove phosphorus in the aerobic reactors. In the nutrification chamber, the microorganisms of the return activated sludge consume soluble substrates produced by the fermentation tank 30. These soluble substrates including acetic acid are metabolized and stored within the respective microorganisms in the anaerobic nutrification zone. While the microorganisms are consuming and storing the soluble substrates, such as acetic acid, they are at the same time releasing some phosphorus.

This conditioned activated sludge is then transferred to the main stream and particularly to an initial aerobic treatment zone 16. The presence of substantial air and oxygen causes the microorganisms to begin to metabolize the soluble substrates consumed in the nutrification chamber 32. In order to sustain the metabolization of these soluble substrates, the microorganisms need phosphorus. Because the microorganisms have consumed an abundance of soluble substrates prior to reaching the main treatment stream, it follows that when they are subjected to an aerobic environment that metabolism is going to be substantial and accordingly, a portion of phosphorus will be required to sustain life. Accordingly, while the microorganisms move with the wastewater through the aerobic treatment zone or zones 16, they will remove some phosphorus for cell growth plus additional and substantial quantities of phosphorus to replace reserves depleted in the nutrification zone.

Besides phosphorus, the present process also is directed towards further reducing the BOD content of the wastewater. In this regard, the BOD is substantially reduced during the trickling filter process. But BOD is continued to be reduced as the wastewater moves through the aerobic treatment zones 16 be cause of the abundance of microorganisms in the presence of oxygen or air. Further, the trickling filter effluent solids will undergo aerobic stabilization.

Also, as already alluded to, it is important in many wastewater treatment processes to remove ammonia nitrogen. Again, this is accomplished by converting the ammonia nitrogen ($NH_4N$) to a nitrate nitrogen ($NO_3N$). This is accomplished as the wastewater passes through the aerobic treatment zone 16. Thereafter, once the wastewater enters the anoxic stage of the process, denitrification occurs and the nitrates are reduced by the microorganisms, leaving the nitrogen in the form of a gas ($N_2$) which escapes the liquid surface to the atmosphere.

The present biological wastewater treatment process can be utilized in wastewater treatment facilities having various capacities. For example, the present process was found appropriate for a wastewater treatment facility having a trickling filter effluent of 4.5 to 6.5 million gallons per day. In such a process it is estimated that the return activated sludge would be approximately 40% of the trickling filter effluent. For such a capacity it is contemplated that approximately 75,000 gallons per day of primary sludge would be conveyed from the primary treatment area 12 through line 28 to fermentation tank 30. As already pointed out, the expected duration for fermentation would be approximately 2 to 5 days. It is contemplated that approximately 40,000 gallons per day of soluble substrates would be conveyed from the fermentation tank 30 to the sludge nutrification container 32. In addition, in such a process, it is contemplated that the life or time period (mean cell residence time) of the activated sludge would be approximately 5 to 15 days. Since the sludge is being continuously discarded, it follows that approximately 6.5-20% of the return activated sludge would be discarded daily.

The following is an example of a wastewater treatment process wherein untreated wastewater having a BOD of 250 mg/l and a phosphorus content of 8.1 mg/l was treated according to the process shown in FIG. 1. The process parameters are given in Table 1. The purified effluent from this process had a BOD of 5 mg/l and a phosphorus content of 0.7 mg/l, and an ammonia nitrogen content of 1.1 mg/l. The sludge was tested and had a SVI of 240 ml/gram at 3,860 mg/l and contained by weight 4.4 percent phosphorus.

TABLE 1

Typical Process Operating Conditions

| Item | Raw | Primary Effluent (incl. Recycle) | T. Filter Effluent | Final Effluent |
|---|---|---|---|---|
| Q-MGD | 5.1 | — | — | — |
| TBOD$_5$-mg/l | 250 | 170 | 90 | 5 |
| SBOD$_5$-mg/l | 85 | 90 | 30 | <2 |
| TSS-mg/l | 240 | 96 | 100 | 12 |
| TKN-mg/l | 40 | 37 | 37 | — |
| NH$_4$N-mg/l | 28 | 29 | 27 | 1.1 |
| NO$_3$N-mg/l | 0 | 0 | 0 | 8.0 |
| TP-mg/l | 8 | 8 | 8 | 0.7 |

Detention times of reactors

| | |
|---|---|
| Fermentation | 3.5 days |
| Nutrification | 3.0 hours |
| Aerobic Mixed Liquor | 6.6 hours (Q) |
| Anoxic Mixed Liquor | 2.6 hours (Q) |
| Settling | 9.8 hours |

Biological System Operation

| | |
|---|---|
| RAS | 2.0 MGD |
| MLSS | 3860 mg/l |
| MASS | 60150 lbs. |
| MCRT | 11.1 days (excluding clarifier and nutrification solids) |
| Yield | 0.77 lb excess sludge/lb BOD$_5$ removed |
| Yield | 5404 lb/d |
| $F_R/M$ | 0.12 lb BOD$_5$R/lb MLSS/d |

Figure 2:
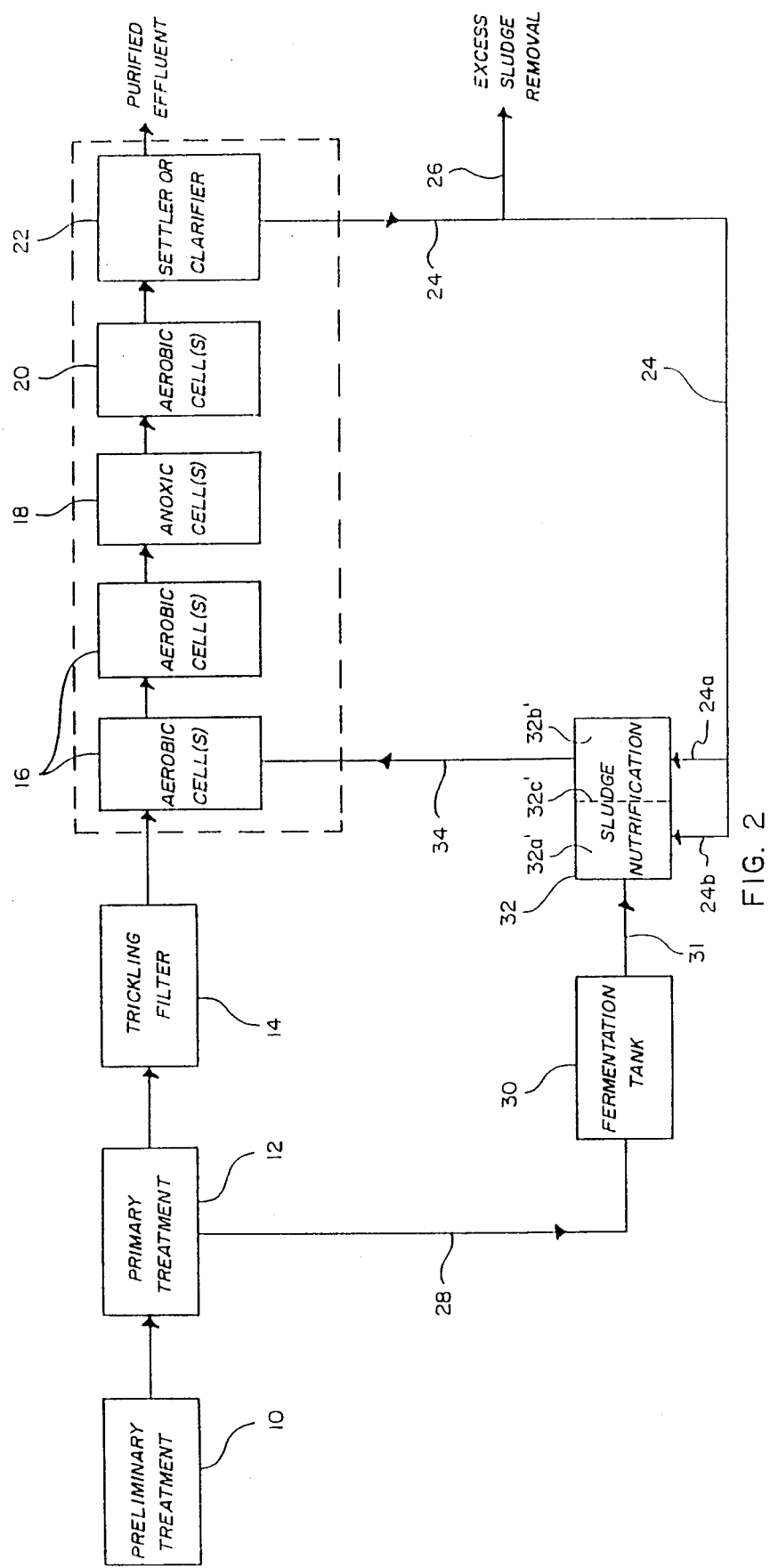
FIG. 2 is a schematic view illustrating a second design and wastewater treatment process of the present invention.

The present invention entails a second design and wastewater treatment process that is schematically illustrated in FIG. 2. The process and system shown in FIG. 2 is referred to as a split flow return activated sludge process. The process disclosed in FIG. 2 is essentially the same process shown in FIG. 1 and described above with the exception of the design of the nutrification chamber 32 and the manner of directing return activated sludge to and through the same.

Viewing FIG. 2, it is seen that the sludge nutrification chamber 32' includes two separate cells, a feeding cell 32a' and a separation cell 32b'. Cells 32a' and 32b' are separated by a partition 32c'. Partition 32c' in the present process is of a design that will permit flow to pass from feeding cell 32a' to separation cell 32b'.

Return activated sludge line 24 is split into lines 24a and 24b. Line 24a is connected to separation cell 32b' while line 24b is connected to feeding cell 32a'.

Fermentation tank 30 is connected through line 31 to the feed cell 32a'. Line 34 connected between the nutrification chamber 32 and the aerobic cell or cells 16 extends from the separation cell 32b'.

In operation, return activated sludge passing in line 24 is split into approximately 2 equal flows or streams that are directed into lines 24a and 24b. The return activated sludge passing in line 24a is directed into separation cell 32b'. Return activated sludge passing through line 24b is directed into feeding cell 32a'. Because of the presence of partition 32c' it is appreciated that the microorganisms within cell 32a' are isolated from those in cell 32'.

In the process shown in FIG. 2, feeding cell 32a' is fed with soluble substrates from the fermentation tank 30. The sludge and soluble substrates are mixed in a anaerobic environment and in a manner similar to the process of FIG. 1. Because the return activated sludge in the case of the present process is approximately equally split, it follows that the number of microorganisms competing for the available food or soluble substrates from the food source or fermentation tank 30 is decreased. This effectively increases the food to mass ratio in the feeding cell 32a'. This in turn creates a more favorable environment for the selection, growth and proliferation of phosphorous consuming microorganisms.

In the case of the process and design of FIG. 2, the basic conditions and parameters discussed with respect to the process shown in FIG. 1 apply. In the case of the process described and shown in FIG. 2, the conditioned return activated sludge found in feeding cell 32a' simply flows over the top of partition 32c into separation cell 32b where it is mixed and combines with the sludge therein and eventually exits the nutrification chamber 32' via line 34.

Figure 3:
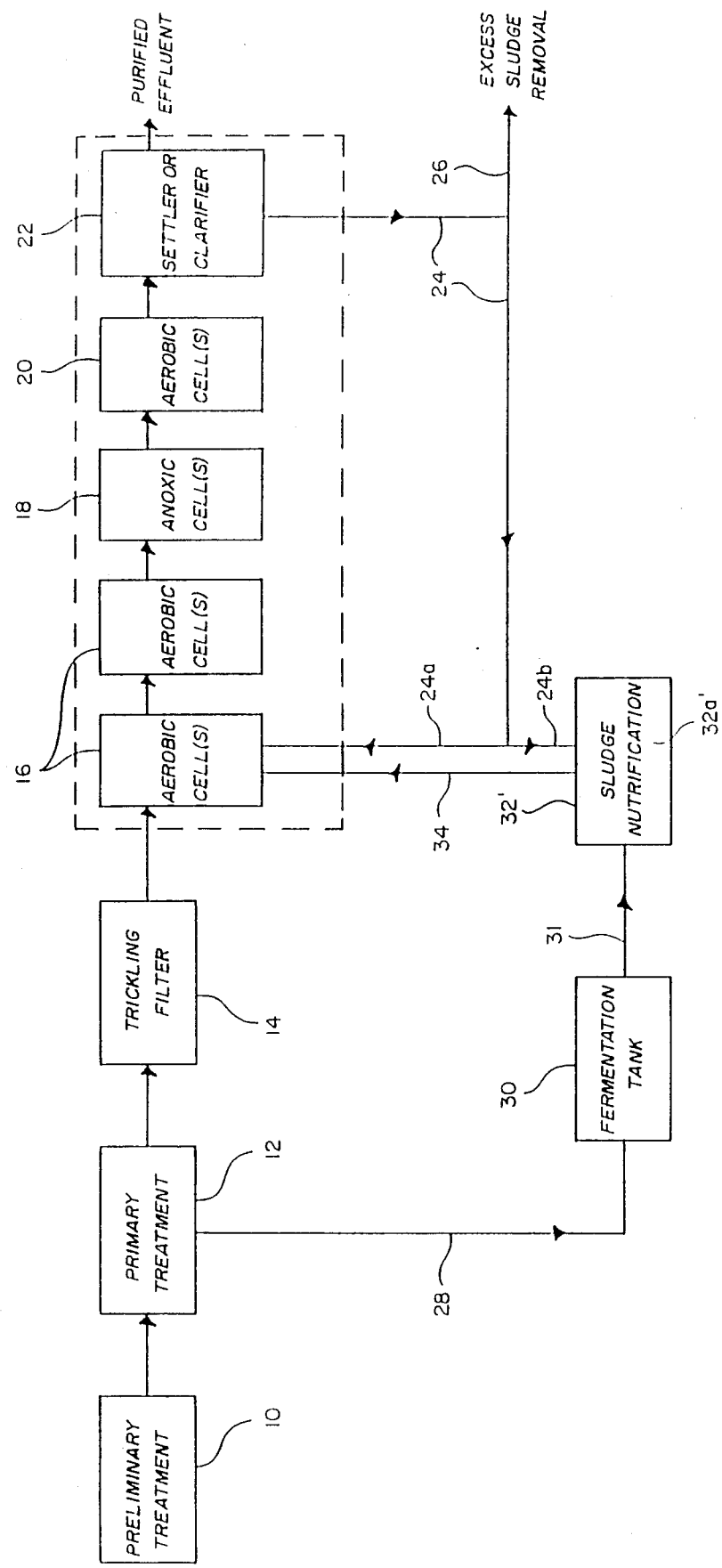
FIG. 3 is a schematic view illustrating an alternate design for the wastewater treatment process illustrated in FIG. 2.

In FIG. 3, there is shown an alternate design for the split flow return activated sludge process just described. In this alternate design, the return activated sludge can be split such that one portion or one stream 24a of the return activated sludge is routed directly back to the aerobic cell or cells 16, completely bypassing the nutrification chamber 32'. In this case, flow line 24a is directed to one or more of the aerobic cells 16 while line 24b is directed to a feeding cell 32a' that is communicatively connected with the fermentation tank 30.

Table 2 shows typical process operating perameters and condition for the split flow return activated sludge process shown in FIG. 2. It is seen that the basic parameters and results generally conform to those depicted in Table 1 that represent the process shown in FIG. 1. However, it is noted that for wastewater having a BOD of 250 mg/l and a phosphorous content of 6 mg/l, that the purified effluent from the process of FIG. 2 had a BOD of less than 5 mg/l and a phosphorous content of 0.3 mg/l, and an ammonia nitrogen content of 0.1 mg/l. The sludge was tested and had a SVI of 80 ml/g and contained by weight 4.2% phosphorous.

TABLE 2

Typical Process Operating Conditions For Split Flow Return Activated Sludge Process

| Item | Raw | Primary Effluent (incl. Recycle) | T. Filter Effluent | Final Effluent |
|---|---|---|---|---|
| Q-MGD | 6.2 | — | — | — |
| TBOD$_5$-mg/l | 250 | 170 | 90 | <5 |
| SBOD$_5$-mg/l | 85 | 90 | 30 | <2 |
| TSS-mg/l | 240 | 96 | 100 | 6 |
| TKN-mg/l | 40 | 37 | 37 | — |
| NH$_4$N-mg/l | 28 | 29 | 27 | 0.1 |
| NO$_3$N-mg/l | 0 | 0 | 0 | 8.0 |
| TP-mg/l | 6 | 6 | 6 | 0.3 |

Detention times of reactors

| | |
|---|---|
| Fermentation | 3.5 days |
| Nutrification | 6.0 hours |
| Aerobic Mixed Liquor | 5.4 hours (Q) |
| Anoxic Mixed Liquor | 1.1 hours (Q) |
| Settling | 8.5 hours |

Biological System Operation

| | |
|---|---|
| RAS | 2.0 MGD |
| MLSS | 2340 mg/l |
| MASS | 32790 lbs. |
| MCRT | 5.0 days (excluding clarifier and nutrification solids) |
| Yield | 0.77 lb excess sludge/lb BOD$_5$ removed |
| Yield | 6570 lb/d |
| $F_R/M$ | 0.26 lb BOD$_5$R/lb MLSS/d |

What is claimed is:

1. A method of removing phosphorus and other pollutants from a pretreated wastewater stream having a relatively low BOD to phosphorus ratio comprising:
   a. separating suspended solids from the wastewater stream and conveying the suspended solids into a fermentation tank and the liquid fraction of the wastewater to further treatment;

retaining the suspended solids in the fermentation tank a sufficient time to permit hydrolysis of the suspended solids so as to form soluble substrates;

c. producing a side stream of return activated sludge;

d. dividing the side stream of return activated sludge into at least two streams;

e. mixing soluble substrates with the return activated sludge of one stream while generally separating the return activated sludge of the other stream from initial contact with the soluble substrates so as to effectively increase the food to mass ratio of the return activated sludge of the stream initially mixed with the soluble substrates;

f. mixing the soluble substrates with return activated sludge and holding the mixture for a selected time period under anaerobic conditions to form conditioned return activated sludge;

g. passing the liquid effluent from the primary treatment through a fixed film reactor and producing a pretreated wastewater effluent having a relatively low BOD to phosphorus ratio;

h. mixing the low BOD to phosphorus effluent with the conditioned return activated sludge; and i. passing the mixture of pretreated effluent and return activated sludge through a series of treatment zones to effectuate the removal of phosphorus and other pollutants.

2. The method of claim 1 including the step of providing a pretreated wastewater effluent wherein the BOD to phosphorus ratio is less than 50% of the BOD to phosphorus ratio of the raw wastewater.

3. The method of claim 1 including the step of holding the soluble substrates and return activated sludge in an unaerated basin for a period of approximately one to four hours.

4. The method of claim 1 including the step of mixing acetic acid with the return activated sludge prior to the return activated sludge being mixed with the pretreated effluent.

5. The method of claim 1 wherein the step of passing the liquid effluent from the primary treatment through a fixed film reactor includes the step of passing the liquid effluent from the primary treatment through a trickling filter system.

6. The method of claim 1 including the step of conveying the pretreated effluent and the conditioned return activated sludge into a first treatment zone and simultaneously mixing and aerating that mixture for a period of 10 to 30 minutes.

7. The method of claim 6 including, after the step of mixing and aerating to produce nitrification, the step of subjecting the mixture of pretreated wastewater effluent and conditioned return activated sludge to an anoxic treatment zone for a period of at least one hour.

8. The method of claim 1 including the step of first subjecting the mixture of low BOD to phosphorus pretreated effluent and conditioned return activated sludge to an initial aerated treatment zone.

9. The method of claim 8 including the step of reducing the BOD content of the wastewater approximately 35% to 65% as the wastewater passes through the fixed film reactor.

10. The method of claim 9 including the step of producing a pretreated wastewater effluent with a BOD to phosphorus ratio within the range of 3 to 10.

11. The method of claim 10 including the step of retaining the suspended solids within the fermentation tank for a period of two to five days.

12. A method of treating wastewater comprising:

a. subjecting wastewater to primary treatment and producing a primary effluent;

b. directing the primary effluent to a secondary treatment area and through a series of secondary treatment zones so as to produce a purified effluent and a return activated sludge stream;

c. returning the return activated sludge in a side stream;

d. splitting the return activated sludge into at least two streams;

e. transferring the return activated sludge of at least one stream to a feeding cell while the return activated sludge of the other stream is at least initially separated from the return activated sludge of the first stream;

f. initially directing soluble substrates into the feeding cell where the soluble substrates are brought first into contact with the return activated sludge in the feeding cell where the food to mass ratio has been effectively increased because of the isolation of the other stream of return activated sludge, thereby producing a more favorable environment for the selection, growth and proliferation of certain microorganisms;

g. mixing soluble substrates with the return activated sludge in the feeding cell and holding the mixture in the feeding cell for a selected time period to form conditioned return activated sludge; and h. conveying the return activated sludge, including the return activated sludge from both streams, back to the secondary treatment area where the return activated sludge is mixed with wastewater passing through the secondary treatment zones.

13. The method of claim 12 wherein the soluble substrates are formed in a side stream fermentation process prior to being directed into the feeding cell.

14. The method of claim 12 including the steps of separating raw sludge from the wastewater during primary treatment, conveying the raw sludge to a side stream fermentation tank, and fermenting the raw sludge to produce the soluble substrates which are directed to the feeding cell.

15. The method of claim 12 including the steps of separating raw sludge from the wastewater during primary treatment; transferring the raw sludge to a fermentation tank; fermenting the raw sludge to form the soluble substrates that are transferred to the feeding cell where they are mixed with the one stream of the return activated sludge found therein; and directing the other stream of return activated sludge to an aerobic treatment zone forming a part of the secondary treatment area.

16. The method of claim 15 including the step of first directing the primary effluent through a fixed film reactor and producing a pretreated wastewater effluent having a relatively low BOD to phosphorus ratio before the same is directed to the secondary treatment area.

17. The method of claim 12 including the steps of conveying the conditioned return activated sludge from the feeding cell to a separation cell, and further including the step of transferring the other stream of return activated sludge to the separation cell, and mixing the conditioned return activated sludge of the feeding cell with the return activated sludge directed to the separation cell.

18. The method of claim 17 including the step of transferring the mixture of conditioned returned activated sludge and return activated sludge of the separation cell to an aerobic treatment zone forming a part of a secondary treatment area.

19. The method of claim 12 wherein there is provided a separation cell and wherein the process includes directing the other stream of return activated sludge to the separation cell and transferring the conditioned return activated sludge in the feeding cell to the separation cell where the conditioned return activated sludge is combined with the other stream of return activated sludge.

20. The method of claim 19 including directing approximately equal flow rates of return activated sludge into each of the feeding and separation cells.

21. The method of claim 20 wherein the feeding and separation cells form a nutrification zone and wherein the process includes the step of maintaining the return activated sludge in the nutification zone for approximately six hours.

22. A method of treating wastewater comprising:
 a. subjecting wastewater to primary treatment and producing a primary effluent;
 b. directing the primary effluent to a secondary treatment area and through a series of secondary treatment zones so as to produce a purified effluent and a return activated sludge stream;
 c. returning the return activated sludge in a side stream;
 d. splitting the return activated sludge into at least first and second streams;
 e. transferring return activated sludge of the first stream to a feeding cell and directing the second stream of return activated sludge to a separation cell;
 f. initially directing soluble substrates into the feeding cell where the soluble substrates are brought first into contact with the return activated sludge in the feeding cell where the food to mass ratio has been effectively increased because of the separation of the first and second streams of the return activated sludge, thereby producing a more favorable environment for the selection, growth and proliferation of certain microorganisms;
 g. mixing soluble substrates with the return activated sludge in the feeding cell and holding the mixture in the feeding cell for a selected time period to form nutrified return activated sludge;
 h. transferring the nutrified return activated sludge from the feeding cell to the separation cell and mixing the nutrified return activated sludge of the feeding cell with the return activated sludge of the separation cell to form a conditioned, nutrified return activated sludge mixture; and
 i. conveying the conditioned, nutrified return activated sludge mixture back to the secondary treatment area where the same is mixed with waste water passing through the secondary treatment zones.

* * * * *